United States Patent Office

3,312,677
Patented Apr. 4, 1967

3,312,677
INTERPOLYMERS OF LOWER ALKYL ACRYLATE ESTERS, OLEFIN-EPOXIDE MONOMERS AND POLYENE MONOMERS
George Rosen, Levittown, Pa., assignor to Thiokol Chemical Corporation, Bristol, Pa., a corporation of Delaware
No Drawing. Filed Oct. 29, 1963, Ser. No. 319,641
11 Claims. (Cl. 260—80.5)

This invention relates to novel interpolymers of lower alkyl acrylate esters, olefin-epoxide monomers and polyene monomers. More particularly, this invention relates to interpolymers of lower alkyl acrylate esters, olefin-epoxide monomers and polyene monomers which may be cured to elastomers with decomposable organic ammonium salts.

Acrylate interpolymers are known in the art which may be cured to form elastomers of good physical properties. However, these interpolymers suffer from one or another disadvantage. Some interpolymers contain chlorine which tends to promote corrosion of the common steel molds used in the fabrication of the molded end articles. Many curable interpolymers known in the art exhibit excessive degrees of fluidity at the high molding temperatures required to effect their cure. Thus, before solidifying these curable compositions often develop pock voids, or blisters, or internal voids which defects are undesirable in the molded end products. Another disadvantage of many prior art acrylate interpolymers is that they are curable only with amine-type vulcanizing agents. The latter add to the corrosive nature of curable compositions formed therewith, and are often toxic.

It is an object of the present invention to provide novel acrylate interpolymers which may be cured to form elastomers using decomposable organic ammonium salts as the curing agents.

Another object of this invention is to provide novel curable acrylate interpolymers formed from lower alkyl acrylate esters, olefin-epoxide monomers and polyene monomers.

Still another object of this invention is to provide novel curable acrylate interpolymers with increased viscosity properties at elevated temperatures.

Other objects of this invention are implicit in or will become apparent from the following explanations and examples.

Unexpectedly, it has been discovered that novel and improved acrylate interpolymers which contain a major portion of acrylate monomers are provided by the interpolymerization of lower alkyl acrylate esters with at least 1% by weight of olefin-epoxide monomers and at least 0.01% by weight of polyene monomers. The interpolymers thus formed may be admixed with decomposable organic ammonium salts and conventional adjuvants to form curable acrylate crude rubber compositions which have excellent bin stability and which are relatively non-toxic and noncorrosive. The interpolymers have other desirable characteristics in that they provide controllable and high Mooney viscosity values at the high molding temperatures that are used in acrylate cure processes. Further, the curable compositions formed with the present interpolymers and decomposable organic ammonium salts may be used in ordinary steel molds, which latter do not have to be specially polished and/or plated to prevent corrosion, as is now required with prior art compositions. Upon cure, vulcanizates are produced from the novel interpolymers of this invention which have excellent elastomeric properties.

In general, the interpolymers of this invention are produced by free radical polymerization of about 60 to 98.99 weight percent of lower alkyl acrylate esters, with up to about 30 weight percent of acrylonitrile, with about 1 to 10 weight percent of olefin-epoxide monomers and with about 0.01 to 1.5 weight percent of polyene monomers. Conventional peroxide, persulfate, or azo type initiators may be used in the interpolymerization process. Benzoyl peroxide and azobisisobutyronitrile are the preferred initiators. The monomers may be polymerized using solution, suspension, emulsion or bulk polymerization methods. The initiator may be added to the monomers either in a single charge, or in increments, or continuously, to initiate polymerization. Adjuvants commonly used in acrylate polymerization procedures may also be added during the reaction such as suspending agents, which prove useful in suspension procedures, to facilitate handling or processing the reaction product. The order of addition of monomers, initiators and adjuvants to the reaction system is as is usually employed in the art for the specific polymerization technique chosen. Polymerization is facilitated by heating and agitation and proceeds until the desired solid interpolymers have formed. The preferred method is aqueous suspension polymerization. The interpolymerization may be conducted in about 2 to 5 hours at about 80 to 100° C.

The lower alkyl acrylates which are usefully employed in the present invention are esters of acrylic acid and lower alkanols. These acrylate esters may be used singly or in combination with one another to make up from about 60 to 98.99 weight percent of the total monomer charge in the interpolymerization process. Of the lower alkanols, both normal and branched chain alcohols may be used, and preferably those which have up to a total of about 8 carbon atoms per molecule. Thus, preferred acrylates formed therefrom and useful herein have either normal or branch-chained alkyl ester groups, and include in their number ethyl acrylate, propyl acrylate, isopropyl acrylate, n-butyl acrylate, isobutyl acrylate, sec.-butyl acrylate, tert.-butyl acrylate, and the isomeric forms of pentyl, hexyl, heptyl and octyl acrylates, and in the latter instance most preferably 2-ethylhexyl acrylate.

Acrylonitrile may be used to replace a portion of the lower alkyl acrylate esters ordinarily employed herein, and in quantities of up to 30 weight percent of the total of monomers charged. Acrylonitrile, where used, has the effect of imparting to the present elastomeric vulcanizates a somewhat greater hardness, higher torsional modulus $G_{10,000}$ temperature, and increased solvent swell resistance to the action of oils than do vulcanizates produced from otherwise identical interpolymers of this invention containing no acrylonitrile.

The polyene monomers, which are usefully employed in quantities of about 0.01 to 1.5 percent by weight of the monomer charge to prepare the present interpolymers, are monomeric materials containing at least two carbon-to-carbon double bond linkages, and may contain from two to four vinyl and/or allylic unsaturated groups per molecule. Mixed polyene monomers may be used which contain both vinyl and allylic groups. The present polyenes are distinguished from the broad class of polyolefin monomers in that the reactive unsaturated groups within any one molecule are not in immediate conjugate position with respect to one another, that is to say the reactive groups are separated by at least one carbon atom. The non-conjugated double bonds of the present polyene monomers are separated by some intervening chemical structure which is inert to reaction with epoxide groups, the nature of which may vary widely from say a sulfur, an oxygen, a polymethylene, or a neopentylene group to an aromatic, an alkylene, or an amido group, etc., and for the purposes of this invention not appreciably detract from the novel qualities desired in the present interpolymers formed therewith.

Table I presents representative useful polyene monomers having allylic unsaturation. These are designed hereinafter as allylic polyene monomers.

TABLE I

Diene monomers allyl beta-allyloxypropionate
diallyl ether
allyl diglycol carbonate
allyl glycol ether
diallyl adipate
diallyl azelate
diallyl carbonate
diallyl diglycolate
diallyl isosebacate
diallyl homophthalate
diallyl malonate
diallyl nadic ester
trimethylol propane diallyl ether
diallyl oxalate
diallyl phthalate
diallyl isophthalate
diallyl terephthalate
diallyl sebacate
diallyl suberate
diallyl succinate
diallyl sulfide

Triene monomers trimethylol propane triallyl ether
triallyl aconitate
triallyl citrate
triallyl cyanurate
triallyl phosphate

Tetraene monomers pentaerythritol tetraallyl ether

Table II presents some representative vinyl polyene monomers of the acrylate type which may be usefully employed in the present invention.

TABLE II

Diene monomers acrylic anhydride
ethylene diacrylate
tetramethylene diacrylate
2-butene-1,4 diol diacrylate
ethylene glycol-2, 2'-dicyanoacrylate
neopentyl glycol-2, 2'-dicyanoacrylate

Triene monomers glyceryl triacrylate

Table III presents some representative vinyl polyene monomers of the methacrylate type which may be usefully employed in the present invention.

TABLE III

Bisphenol "A" dimethacrylate
2,4-dimethylhexanediol-2,5-dimethacrylate
ethylene dimethacrylate
methacrylic anhydride
neopentyl glycol dimethacrylate
tetramethylene dimethacrylate
triethylene glycol dimethacrylate
dimethyl propane dimethacrylate
diethylene glycol dimethacrylate
butyne dimethacrylate
butane dimethacrylate
cyclohexane dimethanol dimethacrylate
butene dimethacrylate

Triene monomers glyceryl trimethacrylate
trimethylol propane trimethacrylate
trimethacrylate of isocyanurate

Tetraene monomers pentaerythritol tetramethacrylate

Table IV presents some other representative vinyl polyene monomers which may be usefully employed in the present invention.

TABLE IV 2,5-dimethylhexadiene-1,5
divinyl benzene
divinyl sulfide
divinyl sulfone
divinyl oxalate
N,N-methylene-bis-acrylamide Table V presents some representative polyene monomers of mixed types, that is those polyenes which contain at least one unsaturated group from at least two of the types found useful herein.

TABLE V

Mixed allylic and vinyl diene monomers allyl acrylate
allyl methacrylate
N-allyl acrylamide
allyl methacrylamide
methallyl acrylate
methallyl methacrylate
vinyl acrylate
vinyl methacrylate
allyl vinyl ether

Mixed allylic and vinyl triene monomers

N,N-diallyl acrylamide
N,N-dimethallylacrylamide
diallyl itaconate

The preferred polyene monomers for use herein are allyl methacrylate and allyl acrylate.

The olefin-epoxide monomers useful for preparation of the present interpolymers are substances which contain at least one polymerizable carbon-to-carbon double bond either of a terminal type, viz. $CH_2{=}C{<}$, and/or of an internal type, viz. $>C{=}C<$; these will hereinafter be termed olefin radicals. The olefin-epoxide monomers also contain at least one epoxide radical, viz.

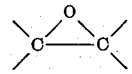

The olefin and epoxide radicals of the present monomers may be joined by some intervening chemical structure which is inert to reaction with epoxide groups, the nature of which may vary widely, such as was previously described, and still not appreciably detract from the novel qualities desired in the present interpolymers formed therewith.

Several methods may be used to prepare the useful olefin-epoxide monomers. One method is by the partial epoxidation of polyene monomers, such as those which are described above in Tables I to V. By "partial epoxidation" is meant that only some of olefin radicals present in the polyene monomers are epoxidized, leaving intact at least one reactive carbon-to-carbon double bond linkage per molecule. This may be accomplished by use of epoxidation methods commonly known to the arts, such as by the Prileschajew reaction, i.e., epoxidation through the action of an organic peracid, such as perbenzoic, peracetic, perphthalic or performic acids on only some of the olefin radicals in the polyene monomers. Other useful olefin-epoxide monomers include dicyclopentadiene monoepoxide, pyran monoepoxide, 4-vinylcyclohexene monoepoxide, isoprene monoepoxide, butadiene monoepoxide and divinyl benzene monoepoxide. The mixed ethers of polymerizable unsaturated alcohols and epoxy alcohols are useful olefin-epoxide monomers, such as vinyl glycidyl ether, allyl glycidyl ether, methallyl glycidyl ether, the allyl ether of beta-methyl glycidol, and others such as are disclosed in U.S. Patent 2,314,039. Useful ester-type olefin-epoxide monomers may be formed by esterification of epoxy alcohols by polymerizable unsaturated acids, such as acrylic, methacrylic, itaconic, fumaric, maleic acids, etc., conversely epoxy acids such as glycidyl acid may be esterified with polymerizable unsaturated alcohols to form such ester-type olefin-epoxide monomers. Allyl glycidyl ether, glycidyl acrylate and glycidyl methacrylate are the preferred olefin-epoxide monomers.

Olefin-epoxide monomers, either singly or in mixture may be used in quantities of about 1 to 10 percent by weight of monomer charge to prepare the present interpolymers. Even such minor quantities as one percent of olefin-epoxide monomers are effective in providing sufficient intact epoxide groups in the interpolymers formed therewith to permit cure by decomposable organic ammonium salts such as are disclosed below.

The present interpolymers may be admixed with decomposable organic ammonium salts to form curable crude rubbers. The crude rubbers upon heat treatment, say at from 250° to 450° F. and in intervals of from about 5 minutes to about 72 hours, will provide elastomers with good physical properties. The lower curing temperatures usually require the longer curing times. When the curable crude rubbers are heat treated in ordinary steel molds, no substantial corrosion of the molds occurs. The curable crude rubbers have good bin stability, that is to say the crude rubber compositions will not deteriorate or change substantially upon standing for prolonged periods of time prior to heat treatment; further, the compositions are relatively nontoxic.

Decomposable organic ammonium salts which may be used to cure the instant interpolymers include ammonium benzoate, ammonium acetate, ammonium citrate, ammonium formate, ammonium gallate, ammonium oxalate, ammonium salicylate, ammonium tartrate, etc. They may be used in quantities of from about 2 to about 10 parts by weight per 100 parts by weight of the instant interpolymers to provide upon cure good elastomers.

The preparation and use in interpolymers of this invention are illustrated in the following examples, which are presented merely as specific embodiments of the present invention. The scope of the invention, however, is not limited merely to practice as taught by the examples for many changes in composition, concentrations, and processing conditions other than those illustrated may be used without departing from the invention as defined in the claims.

EXAMPLE 1

A reaction vessel was charged with 300 parts by weight (p.b.w.) of hot tap water and 5.76 p.b.w. of a 15% by weight aqueous solution of polyacrylic acid, which latter is a suspending aid hereinafter called Alcogum. The Alcogum was uniformly dispersed with agitation, and the resultant mixture was cooled to room temperature. The monomers, 83 p.b.w. of butyl acrylate, 12 p.b.w. of acrylonitrile, 5 p.b.w. of allyl glycidyl ether, an olefin-epoxide, and 0.1 p.b.w. of allyl methacrylate, a mixed polyene, were charged to the aqueous Alcogum dispersion. The temperature of the reaction mixture was elevated to reflux temperatures, at about 87 to 89° C., and maintained thereat with agitation. An initial charge of 0.0035 p.b.w. of azobisisobutyronitrile initiator catalyst in benzene solution was made at the onset of reflux. Five additional charges, 0.0028 p.b.w. each, of initiator catalyst were made at 22 minute intervals thereafter to provide a white solid interpolymer. The polymer product was separated from the liquid portions of the pot mixture and dried. Mooney viscosity measurements were taken on the interpolymer, and gave values of 25 at 212° F. and 14 at 295° F. An interpolymer prepared in identical manner from 83 p.b.w. of butyl acrylate, 12 p.b.w. of acrylonitrile and 5 p.b.w. of allyl glycidyl ether had a Mooney viscosity value of 12 at 212° F. and was too soft to measure at 295° F.

A curable crude rubber composition was prepared by milling together 100 p.b.w. of the first interpolymer prepared as above with 4 p.b.w. of ammonium benzoate, 2 p.b.w. of stearic acid and 40 p.b.w. of "Philblack A" carbon black. The crude rubber obtained was then cured in a rubber press at 2000 p.s.i. and 340° F. for 5 minutes, and then temper cured in an oven for 5 hours at 350° F. The elastomer produced had a tensile strength of 940 p.s.i., an elongation at break of 195% and a Shore A hardness of 53 durometer degrees.

EXAMPLE 2

According to the method of Example 1, a white solid interpolymer of the invention was formed from 98 p.b.w. of ethyl acrylate, 2 p.b.w. of allyl glycidyl ether and 0.1 p.b.w. of allyl methacrylate. The product gave Mooney viscosity values of 81 at 212° F. and 68 at 295° F. An interpolymer prepared in identical manner from 98 p.b.w. of ethyl acrylate and 2 p.b.w. of allyl glycidyl ether had Mooney viscosity of values of 54 at 212° F. and 38 at 295° F.

A curable crude rubber composition was prepared using 100 p.b.w. of the first interpolymer prepared as above and 4 p.b.w. of ammonium benzoate, 2 p.b.w. of stearic acid and 40 p.b.w. of "Philblack A" carbon black by mixing the components on a rubber mill until a physically uniform mixture was obtained. The curable crude rubber composition produced thereby was then cured in a rubber press at 2000 p.s.i. and 340° F. for 5 minutes to produce a vulcanizate, elastomer 2A, which had physical properties as listed below. A portion of elastomer 2A was then temper cured in an oven for 5 hours at 350° F. to produce the vulcanizate, elastomer 2B, with properties as listed.

|  | Elastomer | |
| --- | --- | --- |
|  | 2A | 2B |
| Tensile strength, in p.s.i. | 1,200 | 1,500 |
| Elongation at break, in percent | 630 | 370 |
| Hardness, in Shore A degrees | 42 | 45 |

An interpolymer of the prior art formed from 98 p.b.w. of ethyl acrylate and 0.1 p.b.w. of allyl methacrylate will not cure with ammonium benzoate under identical curing conditions to that used above.

EXAMPLE 3

The method of Example 1, was used to form an interpolymer of this invention from 97 p.b.w. of ethyl acrylate, 3 p.b.w. of allyl glycidyl ether and 0.05 p.b.w. of allyl methacrylate. Mooney viscosity values obtained therewith were 57 at 212° F. and 46 at 295° F. Mooney viscosity values of an interpolymer formed with 98 p.b.w. of ethyl acrylate and 2 p.b.w. of allyl glycidyl ether were 54 at 212° F. and 38 at 295° F.

A curable crude rubber composition was formed by milling together 100 p.b.w. of the first interpolymer prepared as above with 4 p.b.w. of ammonium benzoate, 2 p.b.w. of stearic acid and 40 p.b.w. of "Philblack A" carbon black. The crude rubber obtained was cured in a rubber press at 2000 p.s.i. and 340° F. for 5 minutes and then temper cured in an oven at 350° F. for 5 hours. The vulcanizate obtained had a tensile strength of 1470 p.s.i., an elongation at break of 430% and a Shore A hardness of 54 durometer degrees.

EXAMPLE 4

The method of Example 1 was used to form an interpolymer of this invention from 95 p.b.w. of ethyl acrylate, 5 p.b.w. of allyl glycidyl ether and 0.5 p.b.w. of allyl methacrylate. Mooney viscosity values obtained therewith were 64 at 212° F. and 49 at 295° F. Mooney viscosity values of an interpolymer of the prior art formed with 95 p.b.w. of ethyl acrylate and 5 p.b.w. of allyl glycidyl ether were 31 at 212° F. and 16 at 295° F.

A curable crude rubber composition was formed with the first interpolymer prepared in this example, according to the recipe and method of Example 1, and cured to form elastomers 4A and 4B according to the method described in Example 2 to prepare elastomers 2A and 2B respectively. The physical properties obtained are as listed.

|  | Elastomer | |
|---|---|---|
|  | 4A | 4B |
| Tensile strength, in p.s.i. | 1,190 | 1,190 |
| Elongation at break, in percent | 210 | 150 |
| Hardness, in Shore A degrees | 55 | 59 |

Interpolymers with similar properties are obtained by substituting allyl acrylate for allyl methacrylate, the polyene monomer used in the foregoing process. Further interpolymers with similar properties are obtained by substituting glycidyl acrylate or glycidyl methacrylate for allyl glycidyl ether for the olefin-epoxide monomer used in the foregoing process.

I claim:

1. A solid curable interpolymer having a controllable Mooney viscosity and which may be cured to form an acrylate ester based elastomer comprising about 60 to 98.99 weight percent of at least one lower alkyl acrylate ester, up to about 30 weight percent of acrylonitrile, about 1 to 10 weight percent of at least one olefin-epoxide monomer, and about 0.01 to 1.5 weight percent of at least one polyene monomer, said olefin-epoxide monomer being one which contains in its structure at least one polymerizable carbon to carbon double bond and at least one epoxide group and said polyene monomer being one which contains in its structure at least two non-conjugated carbon to carbon double bond groups selected from the group consisting of vinyl and allylic groups.

2. An interpolymer as in claim 1 wherein at least one of said lower alkyl acrylate esters is ethyl acrylate.

3. An interpolymer as in claim 1 wherein at least one of said lower alkyl acrylate esters is butyl acrylate.

4. An interpolymer as in claim 1 wherein at least one of said olefin-epoxide monomers is allyl glycidyl ether.

5. An interpolymer as in claim 1 wherein at least one of said olefin-epoxide monomers is glycidyl acrylate.

6. An interpolymer as in claim 1 wherein at least one of said olefin-epoxide monomers is glycidyl methacrylate.

7. An interpolymer as in claim 1 wherein at least one of said polyene monomers is allyl methacrylate.

8. An interpolymer as in claim 1 wherein at least one of said polyene monomers is allyl acrylate.

9. A solid curable interpolymer having a controllable Mooney viscosity and which may be cured to form an acrylate ester based elastomer comprising 60 to 98.99 weight percent of at least one lower alkyl acrylate ester selected from the group consisting of ethyl acrylate and butyl acrylate, up to 30 weight percent of acrylonitrile, about 1 to 10 weight percent of at least one olefin-epoxide monomer selected from the group consisting of allyl glycidyl ether, glycidyl acrylate and glycidyl methacrylate and about 0.01 to 1.5 weight percent of at least one polyene monomer selected from the group consisting of allyl acrylate and allyl methacrylate.

10. An interpolymer as in claim 9 wherein said lower alkyl acrylate ester is ethyl acrylate, said olefin-epoxide monomer is allyl glycidyl ether and said polyene monomer is allyl methacrylate.

11. An interpolymer as in claim 9 wherein said lower alkyl acrylate ester is butyl acrylate, said olefin-epoxide monomer is allyl glycidyl ether and said polyene monomer is allyl methacrylate.

References Cited by the Examiner

UNITED STATES PATENTS

| 2,839,514 | 6/1958 | Shokal et al. | 260—80.5 |
| 3,201,497 | 8/1965 | Heino | 260—80.5 |

JOSEPH L. SCHOFER, *Primary Examiner.*

JAMES A. SEIDLECK, *Examiner.*

W. HOOVER, *Assistant Examiner.*